United States Patent
Nagakubo et al.

(10) Patent No.: US 10,841,832 B2
(45) Date of Patent: Nov. 17, 2020

(54) WIRELESS COMMUNICATION DEVICE, WIRELESS COMMUNICATION SYSTEM, WIRELESS COMMUNICATION METHOD, AND COMPUTER PROGRAM PRODUCT

(71) Applicant: KABUSHIKI KAISHA TOSHIBA, Minato-ku (JP)

(72) Inventors: Sakie Nagakubo, Kawasaki (JP); Ren Sakata, Yokohama (JP); Hiroki Kudo, Kawasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 10 days.

(21) Appl. No.: 16/282,067

(22) Filed: Feb. 21, 2019

(65) Prior Publication Data

US 2020/0068429 A1    Feb. 27, 2020

(30) Foreign Application Priority Data

Aug. 24, 2018    (JP) .................................. 2018-157685

(51) Int. Cl.
| | |
|---|---|
| *H04L 12/26* | (2006.01) |
| *H04W 28/02* | (2009.01) |
| *H04L 12/24* | (2006.01) |
| *H04L 12/803* | (2013.01) |
| *H04W 40/34* | (2009.01) |
| *H04W 40/28* | (2009.01) |
| *H04W 40/02* | (2009.01) |
| *H04L 12/801* | (2013.01) |
| *H04W 40/24* | (2009.01) |

(52) U.S. Cl.
CPC ..... *H04W 28/0289* (2013.01); *H04L 41/0659* (2013.01); *H04L 47/11* (2013.01); *H04L 47/122* (2013.01); *H04W 28/0284* (2013.01); *H04W 40/023* (2013.01); *H04W 40/248* (2013.01); *H04W 40/28* (2013.01); *H04W 40/34* (2013.01)

(58) Field of Classification Search
None
See application file for complete search history.

(56) References Cited

U.S. PATENT DOCUMENTS

| | | | |
|---|---|---|---|
| 2006/0215583 A1* | 9/2006 | Castagnoli | H04L 45/60 370/254 |
| 2008/0037527 A1* | 2/2008 | Chan | H04L 67/104 370/353 |
| 2012/0140624 A1* | 6/2012 | Denman | H04L 43/0882 370/230.1 |

(Continued)

FOREIGN PATENT DOCUMENTS

| | | |
|---|---|---|
| JP | 4517885 B2 | 8/2010 |
| JP | 5880223 B2 | 3/2016 |
| JP | 2016-54349 | 4/2016 |

*Primary Examiner* — Brandon M Renner
(74) *Attorney, Agent, or Firm* — Oblon, McClelland, Maier & Neustadt, L.L.P.

(57) ABSTRACT

According to one embodiment, a wireless communication device connected with a multi-hop network includes one or more processors. The processors communicate with a first parent node of the wireless communication device and with a child node of the wireless communication device. The processors transmit an instruction to restrict communication to the child node or do not receive data from the child node when receiving an abnormality notification indicating an abnormality from the first parent node.

13 Claims, 8 Drawing Sheets

(56) References Cited

U.S. PATENT DOCUMENTS

| | | | | |
|---|---|---|---|---|
| 2012/0155276 A1* | 6/2012 | Vasseur | ................... | H04L 45/04 |
| | | | | 370/237 |
| 2015/0379114 A1* | 12/2015 | Onishi | .................... | H04L 67/42 |
| | | | | 707/737 |
| 2019/0004505 A1* | 1/2019 | Joshi | ................... | G05B 19/0428 |
| 2019/0245744 A1* | 8/2019 | Lee | ..................... | H04L 41/0672 |
| 2020/0007223 A1* | 1/2020 | Zhu | .................... | H04B 7/15542 |

\* cited by examiner

WIRELESS COMMUNICATION DEVICE, WIRELESS COMMUNICATION SYSTEM, WIRELESS COMMUNICATION METHOD, AND COMPUTER PROGRAM PRODUCT

CROSS-REFERENCE TO RELATED APPLICATIONS

This application is based upon and claims the benefit of priority from Japanese Patent Application No. 2018-157685, filed on Aug. 24, 2018; the entire contents of which are incorporated herein by reference.

FIELD

Embodiments described herein relate generally to a wireless communication device, a wireless communication system, a wireless communication method, and a computer program product.

BACKGROUND

A multi-hop network has conventionally been known in which data transmitted by a wireless communication device is received and retransmitted by adjacent wireless communication devices so that the data is transmitted to an aggregation device.

It is however difficult with conventional technique to further reduce the power consumption of a wireless communication device.

DETAILED DESCRIPTION

According to one embodiment, a wireless communication device connected with a multi-hop network includes one or more processors. The processors communicate with a first parent node of the wireless communication device and with a child node of the wireless communication device. The processors transmit an instruction to restrict communication to the child node or do not receive data from the child node when receiving an abnormality notification indicating an abnormality from the first parent node. A multi-hop wireless sensor network that relays data, for example, has a problem that data concentrates on some wireless nodes and congestion occurs. In conventional wireless sensor networks, wireless nodes cannot detect congestion and avoid congestion. Furthermore, when combining conventional techniques, many transmission/reception processes are required, and the power consumption becomes high.

In a multi-hop network relaying data in multiple stages in conventional technique, bias is generated in paths, on which wireless nodes are connected, depending on the arrangement of the wireless nodes, and the method of selecting a parent node that is the data transmission destination of a wireless node. Since the amount of data that can be transmitted and received by a wireless node, the amount of data that can be stored, and the like are limited, data discard may possibly occur and the data collection rate of collecting data from all wireless nodes existing in the network to the aggregation device may possibly deteriorate if transmission/reception of data of an amount exceeding the limit is performed. Furthermore, when the number of wireless nodes connected with one wireless node is large, the number of times of transmission/reception of wireless nodes increases, and deterioration in the battery life occurs. In addition, in a wireless node operating under autonomous decentralized control, it is impossible to detect occurrence of congestion. Therefore, once congestion occurs, data transmission continues until failure in communication between nodes occurs, and deterioration in the data collection rate and the battery life due to congestion continues.

Moreover, a technique is known in which a node on a tree accompanying wireless nodes performs search processing, and the best node to be reconnected with the tree and the connection destination are decided. Although it is possible to connect to a new connection destination that avoids congestion with a descendant node accompanied by a node where congestion occurs by applying the above technique when congestion occurs, all accompanied descendant nodes must perform search processing. Since reception processing is performed for adjacent wireless nodes, the power consumption of the search processing is very high, and the battery life of a wireless node is expected to deteriorate.

Furthermore, a technique is also known in which an aggregation device that aggregates data manages load information in a network and can issue a request to switch connection to a new connection destination to a node in a network with poor load information. Although it is possible with this technique to connect a wireless node with a path to avoid congestion, it becomes necessary to manage all nodes by the aggregation device and to transmit and receive much data in order to issue a request to switch connection to each node. Therefore, it is expected that the power saving performance of the wireless node will deteriorate. Moreover, this technique is not realistic in a network that performs autonomous distributed control.

In a wireless communication device of the embodiments described below, a wireless node autonomously detects congestion and judges whether the wireless node itself switches the connection destination or not, for example, so as to avoid congestion by the necessary minimum transmission/reception processing. This makes it possible to avoid deterioration in the data collection rate, the battery life of the wireless node, and the like due to congestion, for example.

Embodiments of a wireless communication device, a wireless communication system, a wireless communication method, and a program that reduce deterioration in the data collection rate, the battery life, and the like caused by occurrence of abnormality such as congestion that a plurality of nodes concentrate on one wireless node, for example, will be described hereinafter in detail with reference to the appended drawings.

First Embodiment

First, the device configuration of a wireless communication system according to the first embodiment will be described.

Example of Device Configuration

Figure 1:
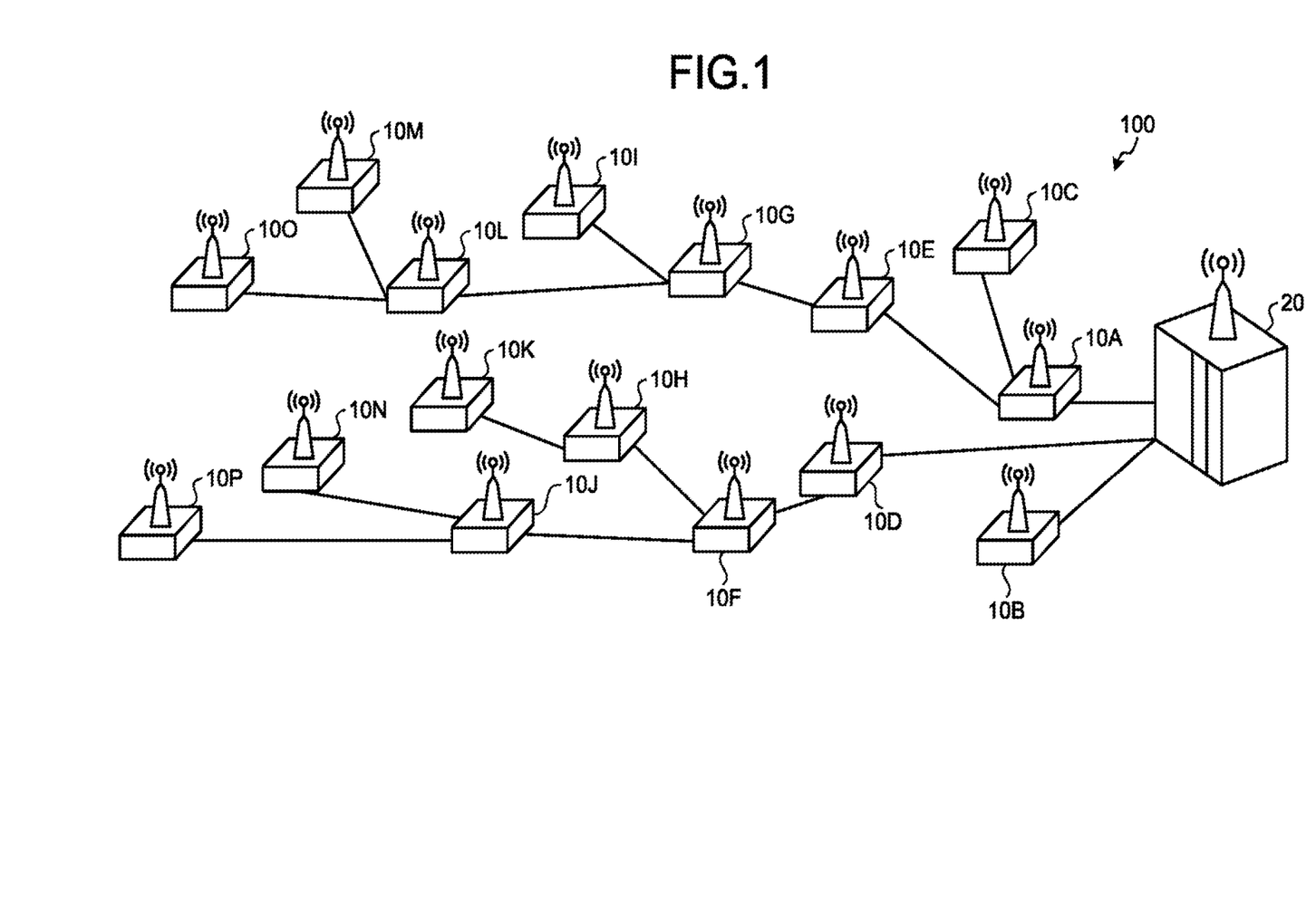
FIG. 1 is a diagram illustrating an example of the device configuration of a wireless communication system according to a first embodiment.

FIG. 1 is a diagram illustrating an example of the device configuration of a wireless communication system 100 according to the first embodiment. The wireless communication system 100 according to the first embodiment is provided with wireless communication devices 10A to 10P and an aggregation device 20. Hereinafter, in a case where the wireless communication devices 10A to 10P are not to be distinguished, they are each simply referred to as a wireless communication device 10.

In the wireless communication system 100, the wireless communication devices 10 and the aggregation device 20 arranged within a predetermined range can perform wireless communication with each other. Data transmitted by each wireless communication device 10 is transmitted to the aggregation device 20 directly or via another wireless communication device 10. The aggregation device 20 aggregates data transmitted from the respective wireless communication devices 10.

Figure 2:
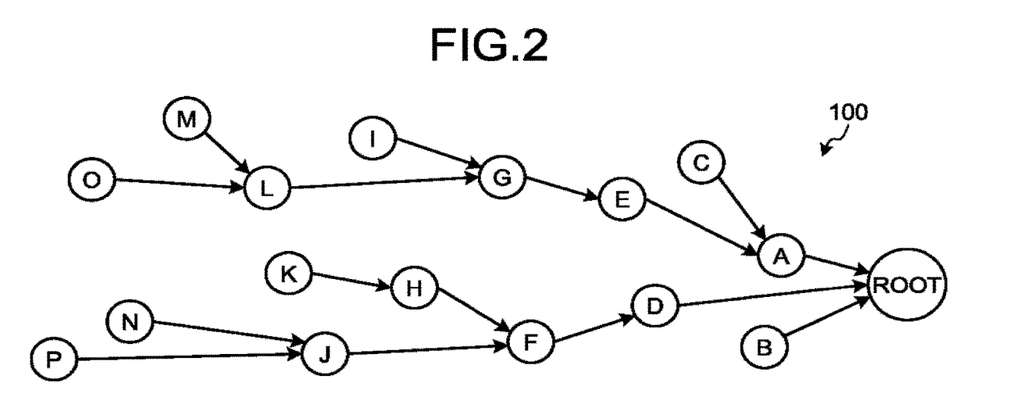
FIG. 2 is a schematic diagram illustrating the wireless communication system of FIG. 1 in the form of a network topology.

FIG. 2 is a schematic diagram illustrating the wireless communication system 100 of FIG. 1 in the form of a network topology. Each alphabet denotes a wireless communication device 10 (wireless node), and ROOT denotes the aggregation device 20 (root node). Moreover, each arrow indicates a data transmission path. The starting point of each arrow indicates the transmission source (child node) of data, and the tip of each arrow indicates the transmission destination (parent node) of data. A parent node is a node having a hop count one smaller than that of its own node and is a transmission destination node of its own node. A child node is a node having a hop count one larger than that of its own node and is a node that has decided its own node as a transmission destination node.

It is to be noted that the communication mode of the wireless communication system 100 may be freely selected. The wireless communication system 100 according to the first embodiment is, for example, a multi-hop network.

Next, an example of the functional configuration of a wireless communication device 10 according to the first embodiment will be described.

Example of Functional Configuration

Figure 3:
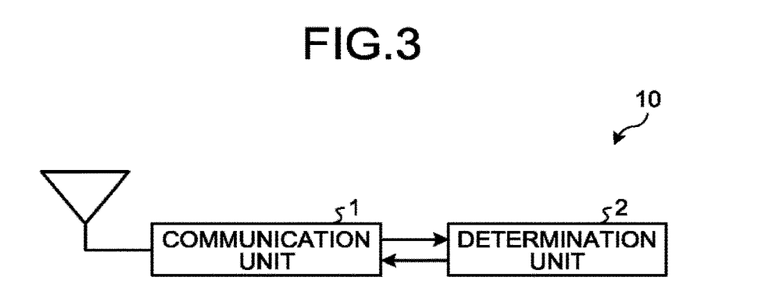
FIG. 3 is a diagram illustrating an example of the functional configuration of a wireless communication device according to the first embodiment.

FIG. 3 is a diagram illustrating an example of the functional configuration of a wireless communication device 10 according to the first embodiment. The wireless communication device 10 according to the first embodiment is provided with a communication unit 1 and a determination unit 2.

The communication unit 1 communicates with a parent node of the wireless communication device 10 and a child node of the wireless communication device. When receiving an abnormality notification indicating an abnormality from the parent node, for example, the communication unit 1 transmits an instruction to restrict communication to the child node. Alternatively, when receiving an abnormality notification indicating an abnormality from the parent node, for example, the communication unit 1 does not receive data from the child node.

Specifically, an abnormality notification indicates at least one of, for example, congestion of the parent node, a malfunction of the parent node, and an error in processing of the parent node. Moreover, an instruction to restrict communication to a child node indicates, for example, a transmission stop instruction to the child node, or an instruction to reduce the amount of data to be transmitted from the child node.

Moreover, when the abnormality notification received from a parent node indicates congestion of the parent node, the communication unit 1 searches for a new parent node. Specifically, when an abnormality notification received from the first parent node indicates congestion of the first parent node, for example, the communication unit 1 searches for a second parent node, which has not transmitted an abnormality notification to the wireless communication device 10 or has not received an abnormality notification, as a new parent node.

When no second parent node is found as a new parent node, the communication unit 1 transmits an instruction to restrict communication to the child node, for example. Alternatively, when no second parent node is found as a new parent node, for example, the communication unit 1 transmits an instruction to search for a new parent node to the child node. Alternatively, when no second parent node is found as a new parent node, for example, the communication unit 1 does not receive data from the child node.

The determination unit 2 performs determination to decide the operation of the communication unit 1. For example, the determination unit 2 determines whether the abnormality notification described above has been received or not, and decides to transmit an instruction to restrict communication to the child node when receiving an abnormality notification.

Example of Operation Method

Figure 4:
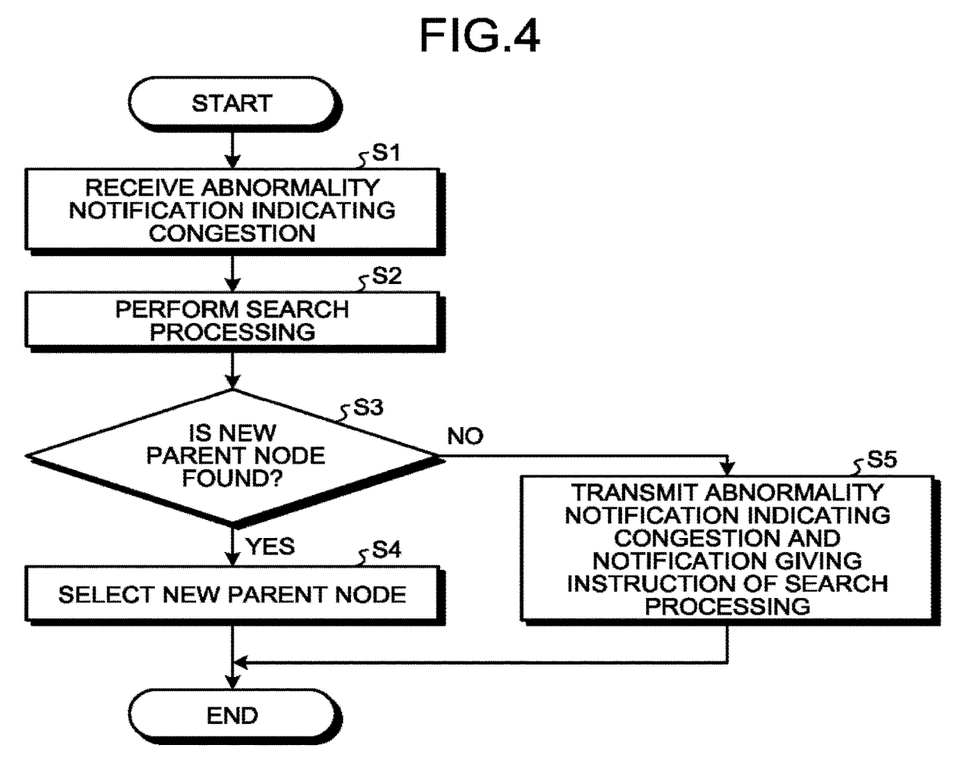
FIG. 4 is a flowchart illustrating an example of an operation method of a wireless communication device according to the first embodiment.

FIG. 4 is a flowchart illustrating an example of an operation method of the wireless communication device 10 according to the first embodiment. First, the communication unit 1 receives an abnormality notification indicating congestion of the parent node from the parent node of the wireless communication device 10 (Step S1).

Next, the communication unit 1 performs search processing of searching for a new parent node (Step S2). Specifically, the communication unit 1 performs reception processing for adjacent wireless nodes (other wireless communication devices 10), and searches for a second parent node, which has not transmitted an abnormality notification to the wireless communication device 10 or has not received an abnormality notification, as a new parent node.

It is to be noted that the search condition for searching for a new parent node (second parent node) can also be set based on the number of child nodes connected with the new parent node, the amount of data to be transmitted from the new parent node, the amount of data to be received by the new parent node, the number of all nodes (the number of nodes directly or indirectly connected with the new parent node) for which the new parent node relays data, and the like.

Next, the determination unit 2 determines whether a new parent node has been found or not (Step S3). When a new parent node is found (Step S3, Yes), the determination unit 2 selects the new parent node (Step S4). When there are a plurality of new parent node candidates, it is to be noted that the determination unit 2 decides one new parent node by a preset selection method.

When no new parent node has been found or when no new parent node has been selected (Step S3, No), the communication unit 1 transmits an abnormality notification indicating congestion and a notification to give an instruction of search processing to a child node of the wireless communication device 10 (Step S5). It is to be noted that the process of Step S5 may be changed. The process of Step S5 may be changed, for example, to a process by the communication unit 1 to transmit an instruction to restrict communication to a child node of the wireless communication device 10. Alternatively, the process of Step S5 may be changed, for example, to a process by the communication unit 1 not to receive data from a child node of the wireless communication device 10.

As described above, in the wireless communication device 10 according to the first embodiment, the communication unit 1 communicates with the parent node (first parent node) of the wireless communication device 10 and with the child node of the wireless communication device 10, and transmits an instruction to restrict communication to the child node or does not receive data from the child node when receiving an abnormality notification indicating an abnormality from the first parent node. Thus, it is possible with the wireless communication device 10 according to the first embodiment to further reduce the power consumption of the wireless communication device 10.

Specifically, in the first embodiment, the wireless communication device 10 itself that has received the abnormality notification indicating congestion switches the parent node to be connected to a new parent node. Thus, it is possible with the wireless communication device 10 according to the first embodiment to reduce failure in data collection due to congestion, and deterioration in the battery life of the wireless communication device 10 due to congestion, for example. When a parent node is not to be switched in the first embodiment, for example, the wireless communication device 10 itself that has received the abnormality notification indicating congestion transmits an instruction to restrict communication to the child node, or does not receive data from the child node. Thus, it is possible with the wireless communication device 10 according to the first embodiment to minimize failure in data collection due to congestion, and deterioration in the battery life of the wireless communication device 10 due to congestion, for example.

Second Embodiment

Next, the second embodiment will be described. In the description of the second embodiment, description similar to that of the first embodiment will be omitted.

Example of Functional Configuration

Figure 5:
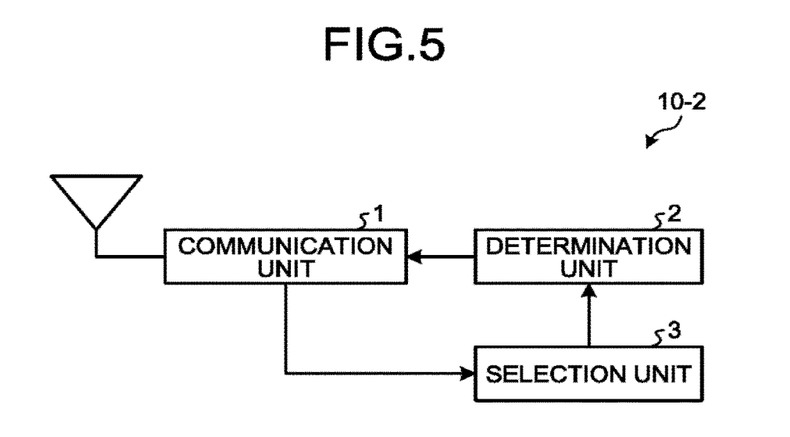
FIG. 5 is a diagram illustrating an example of the functional configuration of a wireless communication device according to a second embodiment.

FIG. 5 is a diagram illustrating an example of the functional configuration of a wireless communication device 10-2 according to the second embodiment. The wireless communication device 10-2 according to the second embodiment is provided with a communication unit 1, a determination unit 2, and a selection unit 3.

In the second embodiment, when an anomaly notification received from the parent node of the wireless communication device 10-2 indicates congestion of the parent node, the selection unit 3 selects a child node of transmission destination of an instruction to restrict communication from child nodes adjacent to the wireless communication device 10-2, for example, based on adjacent node information indicating information on nodes adjacent to the wireless communication device 10-2. Alternatively, when an abnormality notification received from the parent node of the wireless communication device 10-2 indicates congestion of the parent node, for example, the selection unit 3 selects a child node to give an instruction of search processing of a new parent node based on the adjacent node information.

The adjacent node information includes, for example, the number of other nodes existing in the communication range of child nodes adjacent to the wireless communication device 10-2. The selection unit 3 selects, for example, a child node having a communication range where more other nodes exist.

The adjacent node information also includes, for example, the number of other nodes having a hop count from the aggregation device 20 smaller than adjacent child nodes among other nodes existing in the communication range of the adjacent child nodes. The selection unit 3 selects, for example, a child node having a larger number of the other nodes.

The adjacent node information also includes, for example, the sum of the amount of transmission of data (e.g., sensor data or the like) acquired by adjacent child nodes, and the amount of transmission of data received by the child node from low-order nodes (other nodes directly or indirectly connected with the child node). The selection unit 3 selects, for example, a child node having a total sum that is equal to or less than the transmission upper limit amount.

The adjacent node information also includes, for example, the quality of communication (e.g., a packet error rate or the like) between the wireless communication device 10 and adjacent child nodes. The selection unit 3 selects, for example, a child node having a higher communication quality.

The adjacent node information also includes, for example, received signal strength of data transmitted from adjacent child nodes to the wireless communication device 10. The selection unit 3 selects, for example, a child node having a higher received signal strength.

The adjacent node information also includes, for example, the transmitted data amount of adjacent child nodes. The selection unit 3 selects, for example, a child node having a larger transmitted data amount.

The adjacent node information also includes, for example, the received data amount of adjacent child nodes. The selection unit 3 selects, for example, a child node having a larger received data amount.

It is to be noted that the selection unit 3 may select a child node of the transmission destination of an instruction to restrict communication by combining the above-described selection conditions of child nodes.

Example of Operation Method

Figure 6:
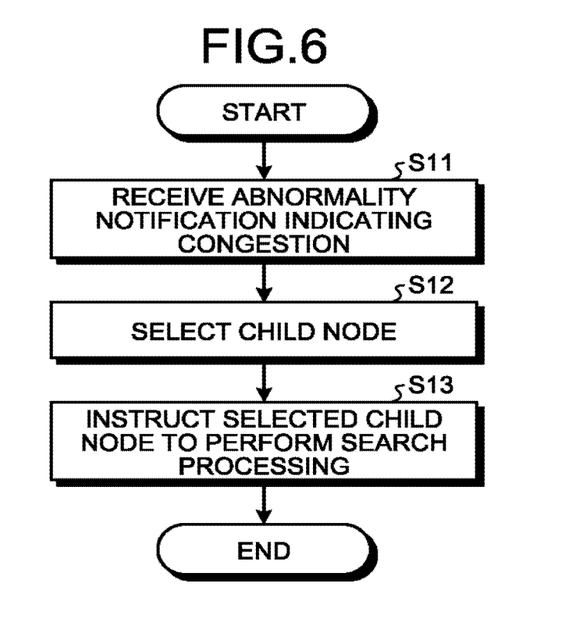
FIG. 6 is a flowchart illustrating an example of an operation method of a wireless communication device according to the second embodiment.

FIG. 6 is a flowchart illustrating an example of an operation method of the wireless communication device 10-2 according to the second embodiment. First, the communication unit 1 receives an abnormality notification indicating congestion of a parent node from the parent node of the wireless communication device 10-2 (Step S11).

Next, the selection unit 3 refers to the adjacent node information described above and selects a child node to given an instruction of search processing of a new parent node from child nodes adjacent to the wireless communication device 10-2 (Step S12). The selection unit 3 selects, for example, a child node having the largest transmitted data amount of child nodes.

Next, the communication unit 1 instructs the child node selected by the process of Step S12 to perform search processing (Step S13). It is to be noted that the process of Step S13 may be changed. The process of Step S13 may be changed, for example, to a process by the communication unit 1 to transmit an instruction to restrict communication to a child node of the wireless communication device 10. Alternatively, the process of Step S13 may be changed to a process by the communication unit 1 not to receive data from a child node of the wireless communication device 10.

As described above, the selection condition described above is provided, and a child node to give an instruction of search is appropriately selected in the second embodiment. It is therefore possible to avoid a congestion state with the necessary minimum search processing without instructing all nodes connected with the wireless communication device 10-2 to perform search processing. For this reason, it is possible to reduce the power consumption of the entire network, for example.

Third Embodiment

Next, the third embodiment will be described. In the description of the third embodiment, description similar to that of the first embodiment will be omitted.

Example of Functional Configuration

Figure 7:
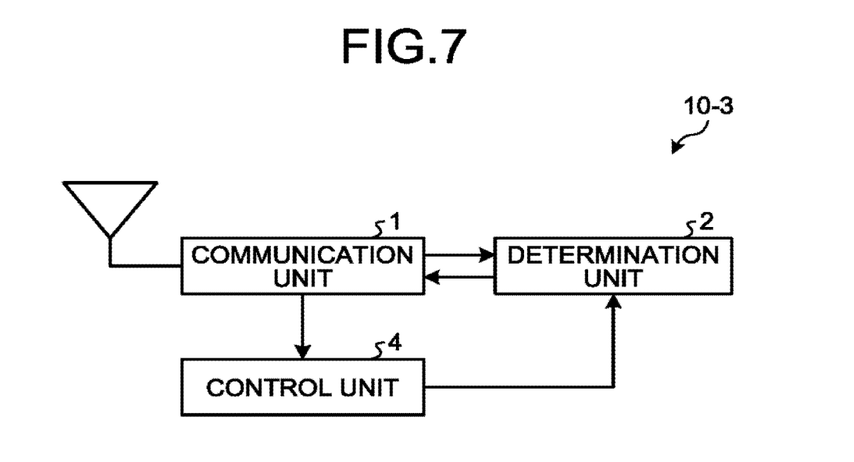
FIG. 7 is a diagram illustrating an example of the functional configuration of a wireless communication device according to a third embodiment.

FIG. 7 is a diagram illustrating an example of the functional configuration of a wireless communication device 10-3 according to the third embodiment. The wireless communication device 10-3 according to the third embodiment is provided with a communication unit 1, a determination unit 2, and a control unit 4.

In the third embodiment, the control unit 4 subtracts from a timer value when the timer value is included in the above-described abnormality notification received from the parent node of the wireless communication device 10-3. The control unit 4 subtracts one from the timer value, for example.

The determination unit 2 further performs determination to decide the operation of the communication unit 1 based on the timer value. An example of determination processing will be described later with reference to FIG. 8.

Example of Operation Method

Figure 8:
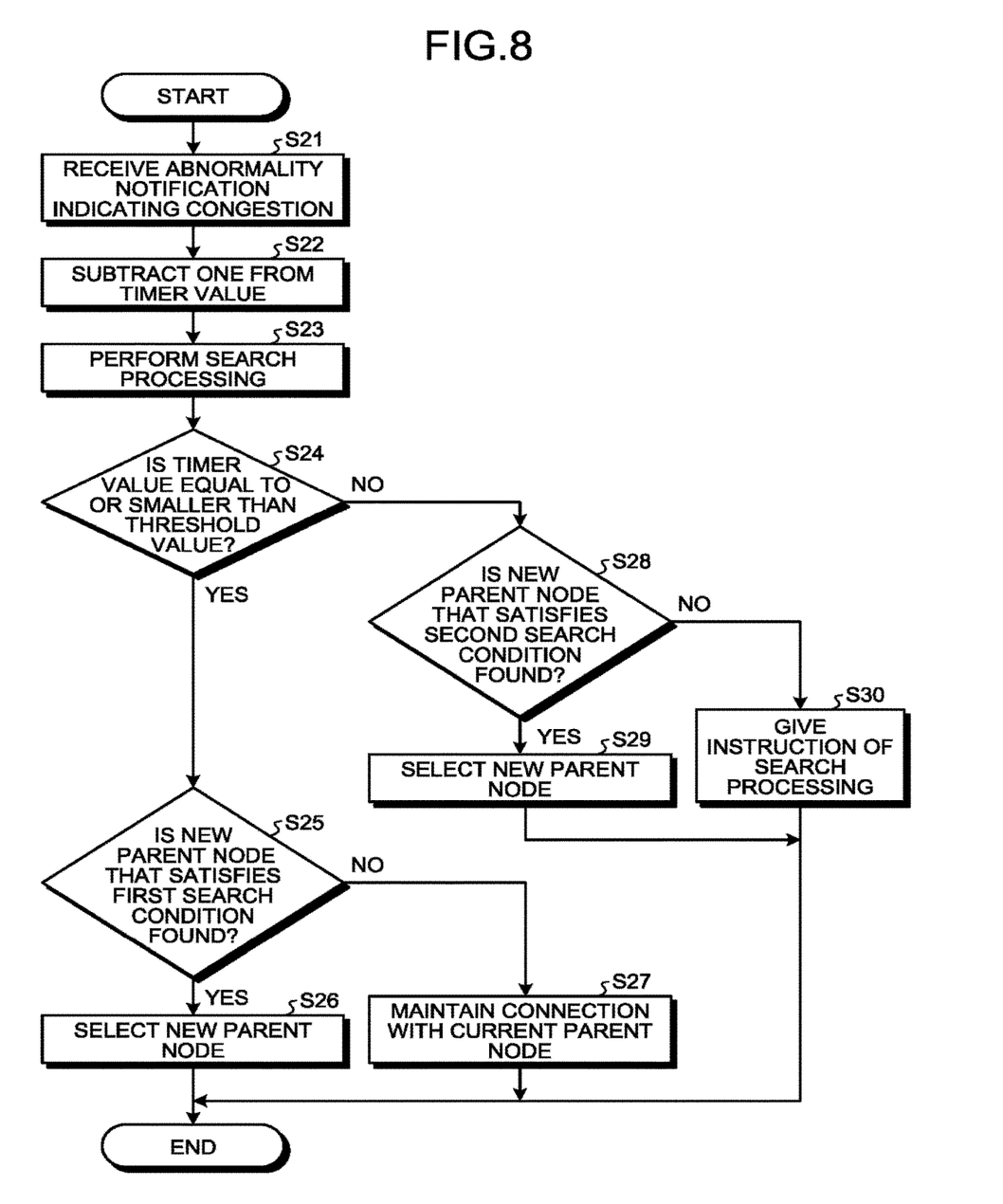
FIG. 8 is a flowchart illustrating an example of an operation method of a wireless communication device according to the third embodiment.

FIG. 8 is a flowchart illustrating an example of an operation method of the wireless communication device 10-3 according to the third embodiment. First, the communication unit 1 receives an abnormality notification indicating congestion of a parent node from the parent node of the wireless communication device 10-3 (Step S21).

Next, the control unit 4 subtracts one from the timer value included in the abnormality notification received by the process of Step S21 (Step S22). Next, the communication unit 1 performs search processing of searching for a new parent node (Step S23).

Next, the determination unit 2 determines whether the timer value obtained by subtracting one by the process of Step S22 is equal to or smaller than a threshold value (e.g., zero or less) or not (Step S24).

When the timer value is equal to or smaller than the threshold value (Step S24, Yes), the determination unit 2 determines whether a new parent node that satisfies the first search condition has been found by the search processing in Step S23 or not (Step S25). The first search condition is, for example, that no abnormality notification has been received from a new parent node.

When a new parent node that satisfies the first search condition is found (Step S25, Yes), the communication unit 1 selects the new parent node as a connection destination (Step S26). When no new parent node that satisfies the first search condition has been found (Step S25, No), the communication unit 1 continues connection with the current parent node (Step S27). Moreover, the search using the first search condition may be repeated in Step S27 until a new parent node can be selected, for example.

On the other hand, when the timer value is larger than the threshold value (Step S24, No), the determination unit 2 determines whether a new parent node that satisfies the second search condition has been found by the search processing in Step S23 or not (Step S28). The second search condition is, for example, that no abnormality notification has been received from a new parent node, and the number of child nodes connected with the new parent node is equal to or smaller than X (X is an integer equal to or larger than one). The number of child nodes X is appropriately set. The number of child nodes X is preset in the wireless communication device 10, for example. Alternatively, the number of child nodes X is, for example, a value, a notice of which has been given from the aggregation device 20. Moreover, the number of child nodes X is, for example, the number of child nodes connected with the wireless communication device 10.

When a new parent node that satisfies the second search condition has been found (Step S28, Yes), the communication unit 1 selects the new parent node as a connection destination (Step S29). When no new parent node that satisfies the second search condition has been found (Step S28, No), the communication unit 1 instructs the child node to perform search processing of a new parent node (Step S30).

It is to be noted that the first search condition and the second search condition are appropriately set. The first search condition and the second search condition are search conditions set based on at least one of; the fact that no abnormality notification has been received from a new parent node; the number of child nodes connected with a new parent node; the amount of data to be transmitted from a new parent node; the amount of data to be received by a new parent node; and the number of nodes directly or indirectly connected with a new parent node, for example. The second search condition is set, for example, to be a search condition severer (stricter) than the first search condition. Specifically, in the second search condition, for example, the number of conditions for determination is made larger than the number of conditions for determination in the first search condition.

As described above, it is possible with the wireless communication device 10 according to the third embodiment to control the search processing of a parent node using the timer value in a path where a node in which congestion has occurred exists. It becomes easier to change a parent node of the connection destination by changing the search condition for searching a parent node after the timer expires. This makes it possible to avoid congestion of a path where the node in which congestion has occurred exists.

It is to be noted that adding may be performed to the timer value described above. In the case of control by adding to the timer value, for example, the control unit 4 adds one to the timer value when the timer value is included in the abnormality notification received from the parent node. Then, the communication unit 1 searches for a new parent node that satisfies the first search condition when the timer value is equal to or larger than the threshold value, or searches for a new parent node that satisfies the second search condition when the timer value is smaller than the threshold value.

The threshold value for the case of adding to the timer value is appropriately set. The threshold value is, for example, a value preset in the wireless communication device 10, a value, a notice of which is given from the aggregation device 20, the maximum hop count of the network, and the like.

It is to be noted that the control method (addition or subtraction) of the timer value is decided based on, for example, data transmitted from the aggregation device 20, data preset in the wireless communication device 10, and the like.

Fourth Embodiment

Next, a fourth embodiment will be described. In the description of the fourth embodiment, description similar to that of the second embodiment will be omitted.

Example of Functional Configuration

Figure 9:
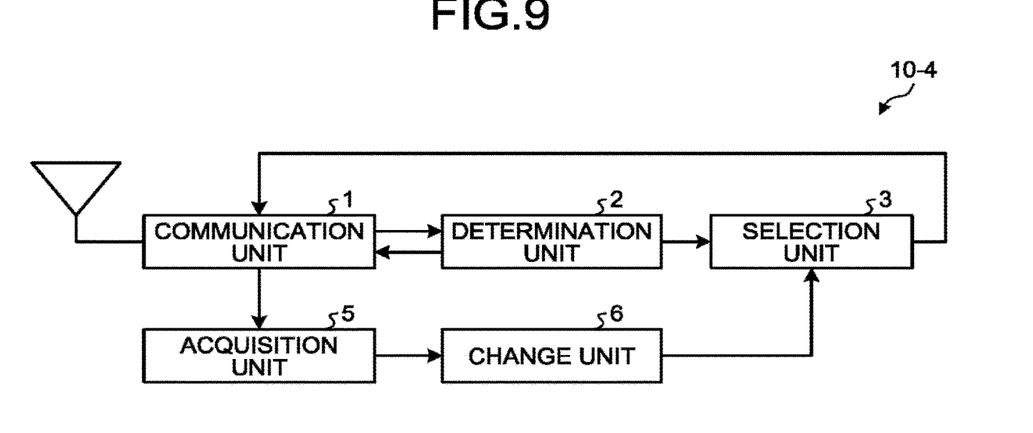
FIG. 9 is a diagram illustrating an example of the functional configuration of a wireless communication device according to a fourth embodiment.

FIG. 9 is a diagram illustrating an example of the functional configuration of a wireless communication device 10-4 according to the fourth embodiment. The wireless communication device 10-4 according to the fourth embodiment is provided with a communication unit 1, a determination unit 2, a selection unit 3, an acquisition unit 5, and a change unit 6.

When an abnormality notification received from a parent node of the wireless communication device 10-3 indicates congestion of the parent node, the selection unit 3 selects a child node of the transmission destination of an instruction to restrict communication, or a child node, to which an execution instruction of search processing is to be transmitted, from child nodes adjacent to the wireless communication device 10-3 based on the adjacent node information described above.

The communication unit 1 gives the number of instructions when transmitting an instruction to restrict communication or transmitting an execution instruction of search processing to a child node selected by the selection unit 3. The number of instructions indicates the number of times an instruction to restrict communication is transmitted to a child node, or the number of times an execution instruction of search processing is transmitted after a certain node receives an abnormality notification indicating congestion. Specifically, for example, the number of instructions becomes one when the wireless communication device 10-3 receives an abnormality notification indicating congestion from a parent node of the wireless communication device 10-3 and transmits an instruction to restrict communication to a child node of the wireless communication device 10. Next, the number of instructions becomes two when the child node that has received an instruction to restrict communication transmits an instruction to restrict communication to a child node (a grandchild node of the wireless communication device 10-3 that has received the abnormality notification indicating congestion) of the child node. Hereinafter, every time an instruction to restrict communication is transmitted, the communication unit 1 of the wireless communication device 10-3 that has transmitted the instruction adds to the number of instructions. It is to be noted that the case where an execution instruction of search processing is transmitted is similar to the case where an instruction to restrict communication is transmitted.

The acquisition unit 5 acquires the number of instructions included in the instruction to restrict communication.

The change unit 6 changes the selection condition of the child node set using the above-described adjacent node information based on the number of instructions acquired by the acquisition unit 5.

Example of Operation Method

Figure 10:
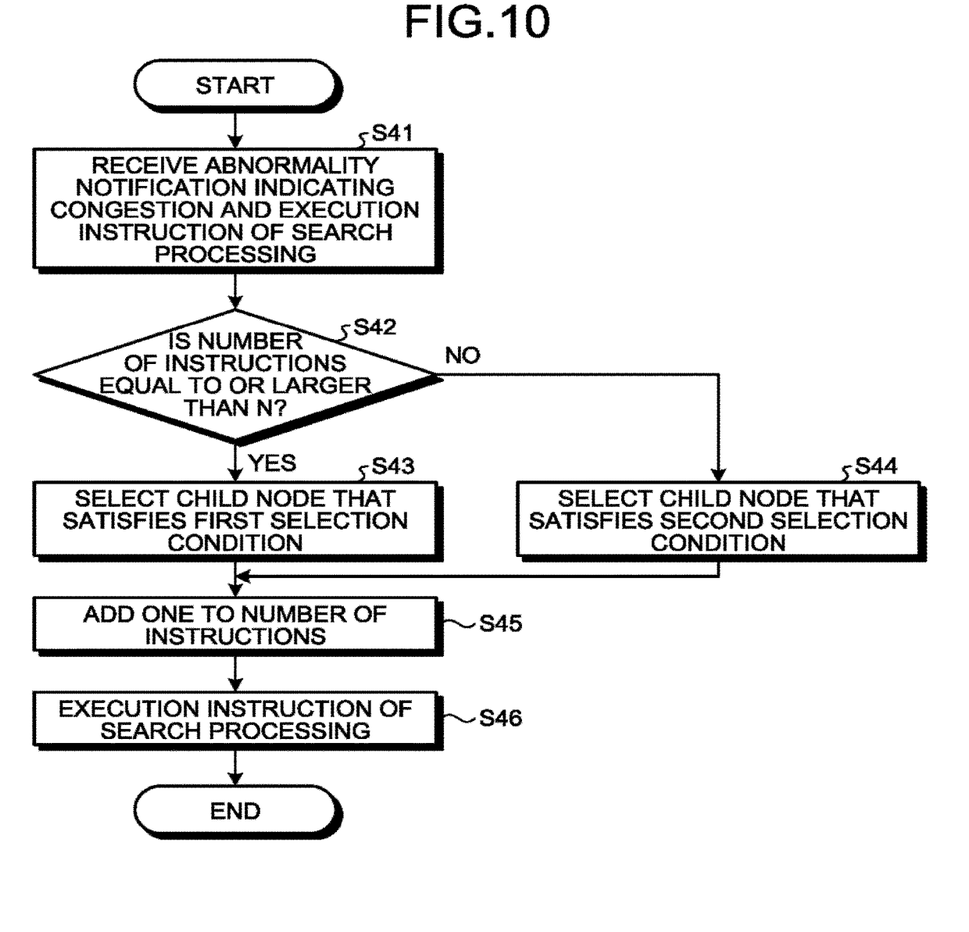
FIG. 10 is a flowchart illustrating an example of an operation method of a wireless communication device according to the fourth embodiment.

FIG. 10 is a flowchart illustrating an example of an operation method of the wireless communication device 10-4 according to the fourth embodiment. First, the communication unit 1 receives an abnormality notification indicating congestion of a parent node and an execution instruction of search processing from the parent node of the wireless communication device 10-4 (Step S41).

Next, the acquisition unit 5 acquires the number of instructions included in the execution instruction of search processing received by the process of Step S41, and determines whether the number of instructions is equal to or larger than N (N is an integer equal to or larger than one) or not (Step S42).

When the number of instructions is equal to or larger than N (Step S42, Yes), the change unit 6 changes the selection condition for selecting a child node, to which the execution instruction of search processing is to be transmitted, to the first selection condition, and the selection unit 3 selects a child node that satisfies the first selection condition (Step S43). The first selection condition is, for example, a child node having the largest transmitted data amount.

When the number of instructions is smaller than N (Step S42, No), the change unit 6 changes the selection condition for selecting the child node, to which the execution instruction of search processing is to be transmitted, to the second selection condition, and the selection unit 3 selects a child node that satisfies the second selection condition (Step S44). The second selection condition is, for example, a child node with the poorest communication quality.

Next, the communication unit 1 adds one to the number of instructions (Step S45) and transmits an execution instruction of search processing including the number of instructions to the child node selected by the process of Step S43 or S44 (Step S46). It is to be noted that the process of Step S46 may be changed. The process of Step S46 may be changed to, for example, a process by the communication unit 1 to transmit an instruction to restrict communication to the child node of the wireless communication device 10-4. Alternatively, the process of Step S46 may be changed to, for example, a process by the communication unit 1 not to receive data from the child node of the wireless communication device 10-4.

As described above, the wireless communication device 10-4 according to the fourth embodiment gives an instruction to restrict communication or an execution instruction of search processing to a descendant node that satisfies a selection condition based on the number of instructions. This makes it possible to reduce unnecessary transmission/reception processing and search processing.

Fifth Embodiment

Next, the fifth embodiment will be described. In the description of the fifth embodiment, description similar to that of the second embodiment will be omitted.

Example of Functional Configuration

Figure 11:
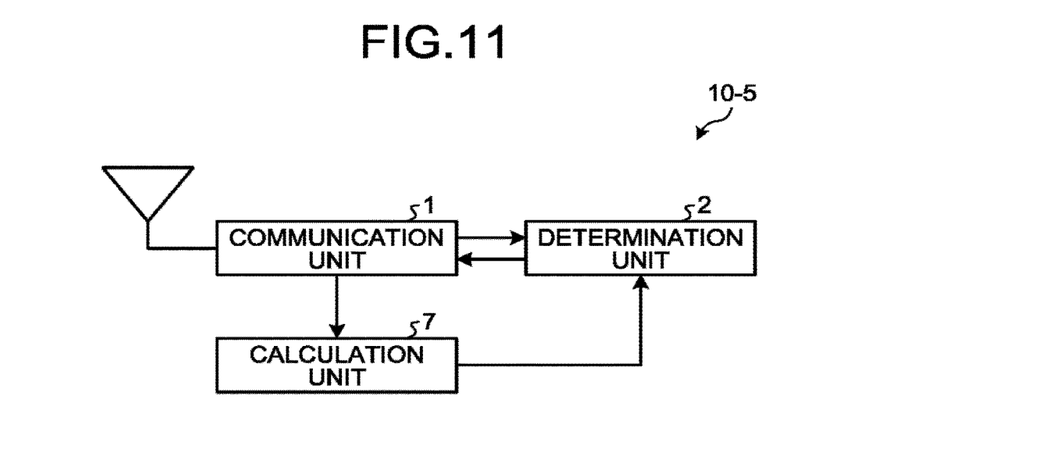
FIG. 11 is a diagram illustrating an example of the functional configuration of a wireless communication device according to a fifth embodiment.

FIG. 11 is a diagram illustrating an example of the functional configuration of a wireless communication device 10-5 according to the fifth embodiment. The wireless communication device 10-5 according to the fifth embodiment is provided with a communication unit 1, a determination unit 2, and a calculation unit 7.

The calculation unit 7 calculates the hop count from the aggregation device 20 that aggregates data to the wireless communication device 10-5.

When the communication unit 1 receives an abnormality notification indicating an abnormality from the parent node of the wireless communication device 10-5 and the hop count from the aggregation device 20 to the wireless communication device 10-5 is equal to or larger than a threshold value, the communication unit 1 transmits an instruction to restrict communication to a child node of the wireless communication device 10-5, does not receive data from the child node of the wireless communication device 10-5, or gives an execution instruction of search processing to the child node of the wireless communication device 10-5.

Example of Operation Method

Figure 12:
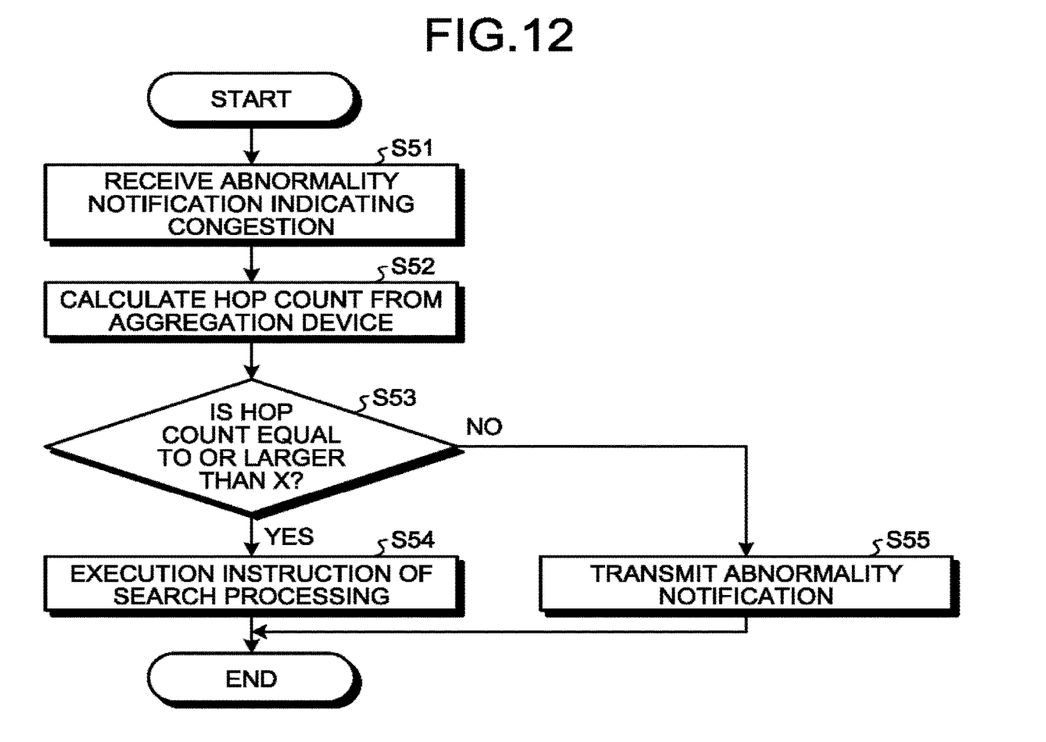
FIG. 12 is a flowchart illustrating an example of an operation method of a wireless communication device according to the fifth embodiment.

FIG. 12 is a flowchart illustrating an example of an operation method of the wireless communication device 10-5 according to the fifth embodiment. First, the communication unit 1 receives an abnormality notification indicating congestion of a parent node from the parent node of the wireless communication device 10 (Step S51).

Next, the calculation unit 7 calculates the hop count from the aggregation device 20 that aggregates the data based on the received data of the wireless communication device 10-5, for example (Step S52).

Next, the determination unit 2 determines whether the hop count calculated by the process of Step S52 is equal to or larger than X (X is an integer equal to or larger than one) or not (Step S53).

When the hop count is equal to or larger than X (Step S53, Yes), the communication unit 1 transmits an execution instruction of search processing to a child node of the wireless communication device 10 (Step S54). It is to be noted that the process of Step S54 may be changed. The process of Step S54 may be changed to, for example, a process by the communication unit 1 to transmit an instruction to restrict communication to a child node of the wireless communication device 10-5. Alternatively, the process of Step S54 may be changed to, for example, a process by the communication unit 1 not to receive data from a child node of the wireless communication device 10-5.

When the hop count is smaller than X (Step S53, No), an abnormality notification received from the parent node is transmitted to a child node (Step S55).

As described above, the wireless communication device 10-5 according to the fifth embodiment gives a path switching instruction (an execution instruction of search processing) to a node (node having a hop count equal to or larger than X) having a deep hop count in the wireless communication device 10-5 connected with the congestion occurrence node. Thus, it is possible with the wireless communication device 10-5 according to the fifth embodiment to reduce congestion, since there is an effect of decreasing the hop count of the entire network.

Finally, an example of the hardware configuration of the wireless communication device 10 and the aggregation device 20 according to the first to fifth embodiments will be described.

First Example of Hardware Configuration

Figure 13:
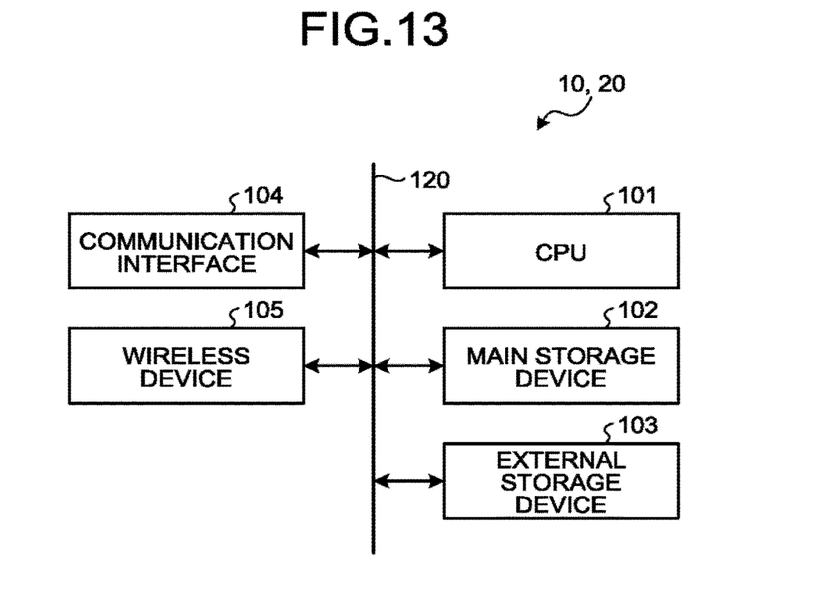
FIG. 13 is a diagram illustrating a first example of the hardware configuration of a wireless communication device and an aggregation device according to the first to fifth embodiments.

FIG. 13 is a diagram illustrating a first example of the hardware configuration of the wireless communication device 10 (10-2 to 10-5) and the aggregation device 20 according to the first to fifth embodiments. In the first example of FIG. 13, the wireless communication device 10 and the aggregation device 20 are each provided with a Central Processing Unit (CPU) 101, a main storage device 102, an external storage device 103, a communication interface 104, and a wireless device 105. The CPU 101, the main storage device 102, the external storage device 103, the communication interface 104, and the wireless device 105 are connected by a bus 120.

The CPU 101 reads a program from a storage medium such as the external storage device 103 and executes the program on the main storage device 102.

The main storage device 102 stores a program, data necessary for executing the program, data generated by executing the program, and the like. The main storage device 102 may be freely selected. The main storage device 102 is, for example, a Random Access Memory (RAM), a Dynamic Random Access Memory (DRAM), an Static Random Access Memory (SRAM), and the like.

The main storage device 102 stores information such as a program, relay data, a node ID, the hop count, and the adjacent node information described above. The relay data is, for example, data received from another node. Specifically, the relay data is, for example, sensor data acquired by another node or the like.

The main storage device 102 may also store an Operating System (OS), a Basic Input Output System (BIOS), various types of middleware, and the like.

The external storage device 103 stores a program, data necessary for executing the program, data generated by executing the program, and the like. These program and data are developed in the main storage device 102 when the program is executed. The external storage device 103 may be freely selected. The external storage device 103 is, for example, a hard disk, an optical disk, a flash memory, a magnetic tape, and the like. The external storage device 103 stores information such as a program, relay data, a node ID, the hop count, or the adjacent node information described above.

It should be noted that a program to be executed by the wireless communication device 10 and the aggregation device 20 may be preliminarily installed into the external storage device 103, for example. Alternatively, for example, the external storage device 103 may store a program transmitted from another device to the aggregation device 20 via another wired or wireless network, so that the program is installed into the external storage device 103.

The communication interface 104 is a general-purpose I/F for communicating with an external device. The communication interface 104 is, for example, a UART, I2C, an SPI, a CAN, RS 232, and an Ethernet (registered trademark) port.

The wireless device 105 is a device for wireless communication of the wireless communication device 10 and the aggregation device 20 with other devices. Moreover, the wireless communication device 10 and the aggregation device 20 may be provided with a plurality of wireless devices 105. When the wireless communication device 10 and the aggregation device 20 are provided with two wireless devices 105, for example, the second wireless device 105 may transmit data collected by the first wireless device 105. It is to be noted that the second wireless device 105 may be a freely selected device that uses a wireless frequency different from that of the first wireless device 105. The second wireless device 105 is of, for example, cellular communication, Wi-Fi, and the like.

Next, a second example of the hardware configuration of the wireless communication device 10 and the aggregation device 20 according to the embodiment will be described.

Second Example of Hardware Configuration

Figure 14:
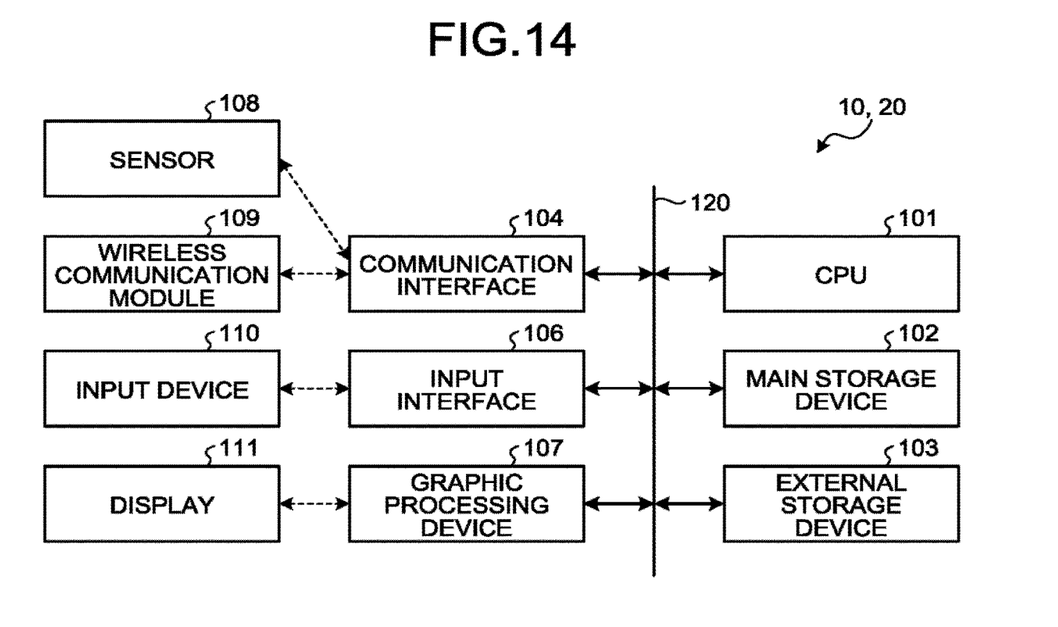
FIG. 14 is a diagram illustrating a second example of the hardware configuration of a wireless communication device and an aggregation device according to the first to fifth embodiments.

FIG. 14 is a diagram illustrating the second example of the hardware configuration of the wireless communication device 10 and the aggregation device 20 according to the first to fifth embodiments. In the second example of FIG. 14, the wireless communication device 10 and the aggregation device 20 are each provided with a CPU 101, a main storage device 102, an external storage device 103, a communication interface 104, an input interface 106, and a graphic processing device 107. The CPU 101, the main storage device 102, the external storage device 103, the communication interface 104, the input interface 106, and the graphic processing device 107 are connected via a bus 120.

Moreover, in the second example of FIG. 14, a sensor 108 and a wireless communication module 109 are connected with the communication interface 104. An input device 110 is connected with the input interface 106. Moreover, a display 111 is connected with the graphic processing device 107.

The description of the CPU 101, the main storage device 102, the external storage device 103, and the communication interface 104 is the same as that of FIG. 13 described above and will be omitted.

The input interface 106 accepts an operation signal corresponding to an input operation accepted by the input device 110 from the input device 110. The input device 110 may be freely selected. The input device 110 is, for example, a keyboard, a mouse, and the like.

The graphic processing device 107 is a device for displaying a video or an image on the display 111 based on a video signal, an image signal, and the like generated by the CPU 101. The display 111 may be freely selected. The display 111 is, for example, a Liquid Crystal Display (LCD), a Cathode Ray Tube (CRT), a Plasma Display (PDP), and the like.

The sensor 108 may be freely selected. The sensor 108 is, for example, an illuminance sensor, a temperature and humidity sensor, an acceleration sensor, an angular velocity sensor, and the like. Moreover, the sensor 108 may be a pseudo sensor. A pseudo sensor is, for example, another computer device that outputs data. It is to be noted that the aggregation device 20 does not necessarily have the sensor 108, since the aggregation device 20 is a device for aggregating data from the wireless communication devices 10.

The wireless communication module 109 plays the role of the wireless device 105 in FIG. 13 described above. The wireless communication module 109 does not necessarily have the same hardware configuration as the wireless device 105 described above. Moreover, like the wireless device 105 in FIG. 13, the wireless communication device 10 and the aggregation device 20 may be provided with a plurality of wireless communication modules 109.

The power supply of the hardware in FIGS. 13 and 14 described above may be freely selected. The power supply of the hardware in FIGS. 13 and 14 described above is, for example, a battery, a generator, a power generation module, a commercial power supply, and the like.

Here, since the power supply of the wireless communication device 10 is related to the power saving performance of the wireless communication device 10, drive by energy supply from a battery, a power generation element, and the like is mainly assumed. However, even if the power supply of the wireless communication device 10 is a commercial power supply, the effect of suppressing the power consumption can be obtained by the wireless communication method according to the first to fifth embodiments described above.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A wireless communication device connected with a multi-hop network, comprising
one or more processors configured to:
communicate with a first parent node of the wireless communication device and with a child node of the wireless communication device,
transmit an instruction to restrict communication to the child node or not to receive data from the child node when receiving an abnormality notification indicating an abnormality from the first parent node,
search for a second parent node, which has not transmitted an abnormality notification to the wireless communication device, as a new parent node when the abnormality notification received from the first parent node indicates congestion of the first parent node, and transmit an instruction to restrict communication to the child node, transmit an instruction to search for a new parent node to the child node, or not to receive data from the child node when the second parent node cannot be found as a new parent node.

2. The wireless communication device according to claim 1, wherein the abnormality notification indicates at least one of congestion of the first parent node, a malfunction of the first parent node, and an error in processing of the first parent node.

3. The wireless communication device according to claim 1, wherein the instruction to restrict communication to the child node indicates a transmission stop instruction to the child node or an instruction to reduce the amount of data to be transmitted from the child node.

4. The wireless communication device according to claim 1, wherein
the abnormality notification further includes a timer value when the abnormality notification indicates congestion of the first parent node, and
the one or more processors
subtract from the timer value when the timer value is included in the abnormality notification received from the first parent node, and
search for a new parent node that satisfies a first search condition when the timer value is equal to or smaller than a threshold value, or search for a new parent node that satisfies a second search condition when the timer value is larger than the threshold value.

5. The wireless communication device according to claim 1, wherein
the abnormality notification further includes a timer value when the abnormality notification indicates congestion of the first parent node, and
the one or more processors
add to the timer value when the timer value is included in the abnormality notification received from the first parent node, and
search for a new parent node that satisfies a first search condition when the timer value is equal to or larger than a threshold value, or search for a new parent node that satisfies a second search condition when the timer value is smaller than the threshold value.

6. The wireless communication device according to claim 4, wherein the first search condition and the second search condition are search conditions set based on at least one of a fact that the abnormality notification has not been received from the new parent node; the number of child nodes connected with the new parent node; the amount of data to be transmitted from the new parent node; the amount of data to be received by the new parent node; and the number of nodes directly or indirectly connected with the new parent node, and
the second search condition is a search condition severer than the first search condition.

7. The wireless communication device according to claim 1, wherein
the one or more processors select a child node of a transmission destination of an instruction to restrict the communication from adjacent child nodes based on adjacent node information indicating information on nodes adjacent to the wireless communication device when an abnormality notification received from the first parent node indicates congestion of the first parent node.

8. The wireless communication device according to claim 7, wherein the adjacent node information includes at least one of: the number of other nodes existing in a communication range of adjacent child nodes; the number of other nodes having a hop count from an aggregation device smaller than adjacent child nodes among other nodes existing in a communication range of adjacent child nodes; the sum of the amount of transmission of data acquired by adjacent child nodes and the amount of transmission of data received from a low-order node by the child node; quality of communication between the wireless communication device and adjacent child nodes; received signal strength of data transmitted from adjacent child nodes to the wireless communication device; the transmission data amount of adjacent child nodes; and the received data amount of adjacent child nodes.

9. The wireless communication device according to claim 8, wherein the one or more processors select an adjacent child node that satisfies the first selection condition set using the adjacent node information as a child node of a transmission destination of an instruction to restrict the communication when the number of instructions to restrict the communication is smaller than a threshold value, or select an adjacent child node that satisfies the second selection condition set using the adjacent node information as a child node of transmission destination of an instruction to restrict the communication when the number of instructions to restrict the communication is equal to or larger than the threshold value.

10. The wireless communication device according to claim 1, wherein the one or more processors transmit an instruction to restrict communication to the child node or do not receive data from the child node when the one or more processors receive an abnormality notification indicating an abnormality from the first parent node and the hop count from an aggregation device to the wireless communication device is equal to or larger than a threshold value.

11. A wireless communication system, comprising:
an aggregation device configured to aggregate data; and
a plurality of wireless communication devices, the aggregation device and the wireless communications devices being connected in a multi-hop network,
wherein each of the wireless communication devices:
communicates with a parent node of the wireless communication device and with a child node of the wireless communication device, and transmits an instruction to restrict communication to the child node or does not receive data from the child node when receiving an abnormality notification indicating an abnormality from the parent node,
searches for a second parent node, which has not transmitted an abnormality notification to the wireless communication device, as a new parent node when the abnormality notification received from the first parent node indicates congestion of the first parent node, and
transmits an instruction to restrict communication to the child node, transmit an instruction to search for a new parent node to the child node, or not to receive data from the child node when the second parent node cannot be found as a new parent node.

12. A wireless communication method of a wireless communication device connected with a multi-hop network, including:

communicating with a first parent node of the wireless communication device and with a child node of the wireless communication device;

transmitting an instruction to restrict communication to the child node or not receiving data from the child node when receiving an abnormality notification indicating an abnormality from the first parent node;

searching for a second parent node, which has not transmitted an abnormality notification to the wireless communication device, as a new parent node when the abnormality notification received from the first parent node indicates congestion of the first parent node; and transmitting an instruction to restrict communication to the child node, transmitting an instruction to search for a new parent node to the child node, or not receiving data from the child node when the second parent node cannot be found as a new parent node.

13. A computer program product having a non-transitory computer readable medium including programmed instructions, wherein the instructions, when executed by a computer connected with a multi-hop network, cause the computer to perform:

communicating with a first parent node of the wireless communication device and with a child node of the wireless communication device, transmitting an instruction to restrict communication to the child node or not receiving data from the child node when receiving an abnormality notification indicating an abnormality from the first parent node, searching for a second parent node, which has not transmitted an abnormality notification to the wireless communication device, as a new parent node when the abnormality notification received from the first parent node indicates congestion of the first parent node, and transmitting an instruction to restrict communication to the child node, transmitting an instruction to search for a new parent node to the child node, or not receiving data from the child node when the second parent node cannot be found as a new parent node.

* * * * *